US009442179B2

(12) United States Patent
Do et al.

(10) Patent No.: US 9,442,179 B2
(45) Date of Patent: Sep. 13, 2016

(54) TIERED POSITIONING ASSISTANCE DATA FOR MOBILE DEVICES WITHIN AN INDOOR ENVIRONMENT

(71) Applicant: QUALCOMM Incorporated, San Deigo, CA (US)

(72) Inventors: Ju-Yong Do, Palo Alto, CA (US); Stephen J. Beauregard, San Jose, CA (US); Weihua Gao, San Jose, CA (US); Sai Pradeep Venkatraman, Santa Clara, CA (US); Amir A. Emadzadeh, Santa Clara, CA (US); Sundar Raman, Fremont, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 13/794,269

(22) Filed: Mar. 11, 2013

(65) Prior Publication Data

US 2014/0253384 A1 Sep. 11, 2014

(51) Int. Cl.
| | |
|---|---|
| *G01S 1/08* | (2006.01) |
| *G01S 5/02* | (2010.01) |
| *G01S 19/12* | (2010.01) |
| *H04W 64/00* | (2009.01) |
| *G01S 19/48* | (2010.01) |

(52) U.S. Cl.
CPC .............. *G01S 5/0236* (2013.01); *G01S 19/12* (2013.01); *H04W 64/00* (2013.01); *G01S 19/48* (2013.01)

(58) Field of Classification Search
CPC .................................. G01S 1/08; H01Q 3/00
USPC .................................................. 342/377, 386
See application file for complete search history.

(56) References Cited

U.S. PATENT DOCUMENTS

| 8,050,686 B1 | 11/2011 | Souissi et al. |
| 2010/0008337 A1 | 1/2010 | Bajko |
| 2011/0086646 A1 | 4/2011 | Gupta et al. |

(Continued)

FOREIGN PATENT DOCUMENTS

WO WO-2009078625 A2 6/2009

OTHER PUBLICATIONS

Bareth U., et al., "Energy-Efficient Position Tracking in Proactive Location-Based Services for Smartphone Environments", Computer Software and Applications Conference (COMPSAC), 2011 IEEE 35TH Annual, IEEE, Jul. 18, 2011, pp. 516-521, XP031972272, DOI: 10.1109/COMPSAC.2011.72 ISBN: 978-1-4577-0544-1.

(Continued)

*Primary Examiner* — Harry Liu
(74) *Attorney, Agent, or Firm* — Berkeley Law & Technology Group, LLP

(57) ABSTRACT

Various methods, apparatuses and/or articles of manufacture are provided which may be implemented in one or more electronic devices supporting mobile device positioning within an indoor environment. Tiered positioning assistance data (tiered-PAD) corresponding to an indoor environment may be generated and/or distributed. Mobile device positioning and/or navigation capabilities may be based, at least in part, on tiered-PAD corresponding to the indoor environment. Tiered-PAD may be provided to a plurality of mobile devices. A given mobile device may, for example, select applicable portion(s) of tiered-PAD to affect one or more positioning functions and/or the like which may be performed, at least in part, by the mobile device.

76 Claims, 5 Drawing Sheets

(56) References Cited

U.S. PATENT DOCUMENTS

| | | |
|---|---|---|
| 2011/0103360 A1 | 5/2011 | Ku et al. |
| 2011/0140960 A1* | 6/2011 | Wirola .................. G01S 5/0063 342/357.42 |
| 2012/0044107 A1* | 2/2012 | Huang .................... G01S 19/05 342/357.42 |
| 2012/0225663 A1 | 9/2012 | Gupta et al. |
| 2013/0029685 A1 | 1/2013 | Moshfeghi |
| 2014/0080506 A1* | 3/2014 | Siomina ................ H04W 64/00 455/456.1 |

OTHER PUBLICATIONS

International Search Report and Written Opinionz—PCT/US2014/022217—ISA/EPO—Nov. 6, 2011 (130713WO).

\* cited by examiner

TIERED POSITIONING ASSISTANCE DATA FOR MOBILE DEVICES WITHIN AN INDOOR ENVIRONMENT

BACKGROUND

1. Field

The subject matter disclosed herein relates to electronic devices, and more particularly to methods, apparatuses and articles of manufacture for use by one or more electronic devices supporting mobile device positioning within an indoor environment.

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation device, a tracking device, etc.

The global positioning system (GPS) and other like satellite positioning systems (SPSs) may enable positioning and navigation services for mobile devices under certain conditions. For example, a mobile device located in an outdoor environment may perform certain positioning and navigation services based on acquired SPS signals transmitted by satellites. However, in certain instances, such as when they mobile device is located within an indoor environment, such satellite transmitted signals may be unavailable, e.g., due to signal interference.

Accordingly, in certain indoor environments, different positioning techniques may be employed to enable positioning and navigation services. For example, a mobile device located within certain indoor environments may seek to obtain a position fix (e.g., an estimated location) by estimating ranges to one or more terrestrial-based wireless network access points (APs) and/or other like wireless signal transmitting devices installed at known positions. Such ranges may be determined using known techniques based on one or more signal characteristics for one or more wireless signals acquired from and/or exchanged with such transmitting devices.

By way of a further example, such ranges may be determined by identifying a transmitting device (e.g., from a MAC ID address or other like information encoded in a transmitted message and/or otherwise determinable by an acquired wireless signal), and identifying a location of the transmitting device (e.g., from positioning assistance data and/or the like). Thus, for example, by measuring one or more characteristics of acquired wireless signal(s), such as, for example, a received signal strength (RSSI), a round trip time (RTT), just to name a few examples, an estimate of a distance (range) is from the mobile device to a transmitting device may be determined. Accordingly, with adequate range data available, a position fix for a mobile device may be determined using trilateration and/or other like known techniques. In certain instances, a position fix may even be based on a mixture of SPS pseudorange(s) and range(s) to one or more terrestrial-based transmitting devices.

Positioning assistance data may comprise a wide variety of information that may be useful to a positioning function enabled to provide and/or otherwise support certain positioning and/or navigation capabilities. For example, in the preceding examples various types of positioning assistance data may be applied in determining an SPS pseudorange and/or a range to one or more terrestrial-based transmitting devices. Hence, information provided within positioning assistance data may vary depending not only on the source of the wireless signals but also on the positioning function and its supported positioning and/or navigation capabilities. For example, positioning assistance data associated with terrestrial-based transmitting devices and/or other like terrestrial-based positioning services will clearly vary from one location to another.

In some instances, positioning assistance data may simply provide just enough information to obtain a rough position fix for a mobile device. For example, in certain instances a rough position fix for mobile device may be based on positioning assistance data indicating positions for APs nearby a mobile device. Thus, for example, a positioning function in certain mobile devices may select one of these APs (e.g. based on signal strength) and adopt the indicated location of the selected AP as its own rough position. In other example implementations, a positioning function may apply a more advanced algorithm to determine its position fix based on signal strengths, or other measured signal characteristics, associated with a plurality of APs and there indicated positions.

As may be appreciated, the amount of positioning assistance data may increase as additional information may be provided, e.g. corresponding to certain signal characteristics (e.g., encoded in various wireless signal propagation related parameters), and/or possibly even certain environment characteristics (e.g., encoded in various navigation parameters). For example, in certain instances positioning assistance data may comprise all or part of an electronic map and/or the like, which may correspond to an indoor environment and facilitate and/or enable location based services (LBS) and/or the like. In certain instances, (probability) radio heatmap data indicating expected RSSI, RTT values and/or the like associated with one or more APs may be provided. Further, in certain instances positioning assistance data may comprise routebability graphs, probability heatmaps, electronic maps for display, and/or the like or some combination thereof just to name a few examples.

As may be appreciated providing positioning assistance data to a plurality of mobile devices may, at times, be a complex undertaking given the plethora of positioning assistance data that may be available (some of which may be fairly voluminous), and the number of different positioning techniques which may be implemented in a variety of different types of mobile devices many of which may have their own specific requests, capabilities, limitations, etc. Indeed, in certain instances it may be exceedingly complex, costly, and/or otherwise inefficient (e.g., due to bandwidth limitations, etc.) to attempt to provide specific version(s) of positioning assistance data to various different mobile devices.

SUMMARY

In accordance with certain aspects, a method may be provided for use at a mobile device. The method may comprise, for example, receiving a message corresponding to an indoor environment, the message having been broadcast by a transmitting device provisioned within the indoor environment or within a threshold distance from the indoor environment and comprising tiered positioning assistance data (tiered-PAD) for use by a plurality of mobile devices. The method may further comprise accessing a specific portion of the tiered-PAD from the message, and affecting a positioning function performed, at least in part, by the mobile device based, at least in part, on the specific portion of the tiered-PAD.

In accordance with certain further aspects, an apparatus may be provided for use in a mobile device. The apparatus may, for example, comprise means for receiving a message corresponding to an indoor environment, the message having been broadcast by a transmitting device provisioned within the indoor environment or within a threshold distance from the indoor environment and comprising tiered-PAD for use by a plurality of mobile devices. The apparatus may further comprise means for accessing a specific portion of the tiered-PAD from the message, and means for affecting a positioning function performed, at least in part, by the mobile device based, at least in part, on the specific portion of the tiered-PAD.

In accordance with still another aspect, a mobile device may comprise a network interface unit and a processing unit. The processing unit may receive a message corresponding to an indoor environment via the network interface unit, the message having been broadcast by a transmitting device provisioned within the indoor environment or within a threshold distance from the indoor environment and comprising tiered-PAD for use by a plurality of mobile devices. The processing unit may further access a specific portion of the tiered-PAD from the message, and affect a positioning function performed, at least in part, by the mobile device based, at least in part, on the specific portion of the tiered-PAD.

In accordance with yet other aspects, an article of manufacture may be provided which comprises a non-transitory computer readable medium having stored therein computer implementable instructions executable by a processing unit of a mobile device to: receive a message corresponding to an indoor environment, the message having been broadcast by a transmitting device provisioned within the indoor environment or within a threshold distance from the indoor environment and comprising tiered-PAD for use by a plurality of mobile devices; access a specific portion of the tiered-PAD from the message; and affect a positioning function performed, at least in part, by the mobile device based, at least in part, on the specific portion of the tiered-PAD.

In accordance with certain further aspects, a method may be provided for use in a computing platform. The method may comprise generating tiered-PAD corresponding to an indoor environment, the tiered-PAD indicative of at least: (1) first tier positioning assistance data to affect at least a first positioning function of a first mobile device while located in the indoor environment, and a second positioning function of a second mobile device while located in the indoor environment, and (2) second tier positioning assistance data to affect at least the second positioning function in the second mobile device while located in the indoor environment, but not the first positioning function in the first mobile device. The method may further comprise generating at least a portion of a message comprising the tiered-PAD for transmission to a first mobile device and a second mobile device by a transmitting device provisioned within the indoor environment or within a threshold distance from the indoor environment.

In accordance with at least one other aspect, an apparatus may be provided which comprises means for generating tiered-PAD corresponding to an indoor environment, the tiered-PAD indicative of at least: (1) first tier positioning assistance data to affect at least a first positioning function of a first mobile device while located in the indoor environment, and a second positioning function of a second mobile device while located in the indoor environment, and (2) second tier positioning assistance data to affect at least the second positioning function in the second mobile device while located in the indoor environment, but not the first positioning function in the first mobile device. The apparatus may further comprise means for generating at least a portion of a message comprising the tiered-PAD for transmission to a first mobile device and a second mobile device by a transmitting device provisioned within the indoor environment or within a threshold distance from the indoor environment.

In accordance with still further aspects, electronic device may be provided which comprises memory and a processing unit. The processing unit may generate tiered-PAD corresponding to an indoor environment, the tiered-PAD indicative of at least: (1) first tier positioning assistance data to affect at least a first positioning function of a first mobile device while located in the indoor environment, and a second positioning function of a second mobile device while located in the indoor environment, and (2) second tier positioning assistance data to affect at least the second positioning function in the second mobile device while located in the indoor environment, but not the first positioning function in the first mobile device. The processing unit may further generate at least a portion of a message comprising the tiered-PAD for transmission to a first mobile device and a second mobile device by a transmitting device provisioned within the indoor environment or within a threshold distance from the indoor environment.

In accordance with certain other aspects, an article of manufacture may be provided which comprises a non-transitory computer readable medium having stored therein computer implementable instructions executable by a processing unit of an electronic device to: generate tiered-PAD corresponding to an indoor environment, the tiered-PAD indicative of at least: (1) first tier positioning assistance data to affect at least a first positioning function of a first mobile device while located in the indoor environment, and a second positioning function of a second mobile device while located in the indoor environment, and (2) second tier positioning assistance data to affect at least the second positioning function in the second mobile device while located in the indoor environment, but not the first positioning function in the first mobile device; and generate at least a portion of a message comprising the tiered positioning assistance data for transmission to a first mobile device and a second mobile device by a transmitting device provisioned within the indoor environment or within a threshold distance from the indoor environment.

In accordance with yet another aspect, a method that may be implemented at a transmitting device may comprise: obtaining tiered positioning assistance data (tiered-PAD) corresponding to an indoor environment, the tiered-PAD indicative of at least: (1) first tier positioning assistance data to affect at least a first positioning function of a first mobile device while located in the indoor environment, and a second positioning function of a second mobile device while located in the indoor environment, and (2) second tier positioning assistance data to affect at least the second positioning function in the second mobile device while located in the indoor environment, but not the first positioning function in the first mobile device; and transmitting a message comprising the tiered-PAD to a first mobile device and a second mobile device within the indoor environment or within a threshold distance from the indoor environment.

In accordance with certain further aspects, an apparatus may be provided which comprises means for obtaining tiered positioning assistance data (tiered-PAD) corresponding to an indoor environment, the tiered-PAD indicative of at least: (1) first tier positioning assistance data to affect at least a first positioning function of a first mobile device while located in the indoor environment, and a second positioning function of a second mobile device while located in the indoor environment, and (2) second tier positioning assistance data to affect at least the second positioning function in the second mobile device while located in the indoor environment, but not the first positioning function in the first mobile device; and means for transmitting a message comprising the tiered-PAD to a first mobile device and a second mobile device within the indoor environment or within a threshold distance from the indoor environment.

In accordance with an aspect, a device may be provided which comprises memory; a transmitter; and a processing unit to: obtain tiered positioning assistance data (tiered-PAD) from the memory, the tiered-PAD corresponding to an indoor environment, the tiered-PAD indicative of at least: (1) first tier positioning assistance data to affect at least a first positioning function of a first mobile device while located in the indoor environment, and a second positioning function of a second mobile device while located in the indoor environment, and (2) second tier positioning assistance data to affect at least the second positioning function in the second mobile device while located in the indoor environment, but not the first positioning function in the first mobile device; and initiate transmission of a message comprising the tiered-PAD via the transmitter to a first mobile device and a second mobile device within the indoor environment or within a threshold distance from the indoor environment.

In accordance with certain aspects, an article of manufacturing may be provided which comprises a non-transitory computer readable medium having stored therein computer implementable instructions executable by a processing unit of a device to: obtain tiered positioning assistance data (tiered-PAD) corresponding to an indoor environment, the tiered-PAD indicative of at least: (1) first tier positioning assistance data to affect at least a first positioning function of a first mobile device while located in the indoor environment, and a second positioning function of a second mobile device while located in the indoor environment, and (2) second tier positioning assistance data to affect at least the second positioning function in the second mobile device while located in the indoor environment, but not the first positioning function in the first mobile device; and initiate transmission of a message comprising the tiered-PAD to a first mobile device and a second mobile device within the indoor environment or within a threshold distance from the indoor environment.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
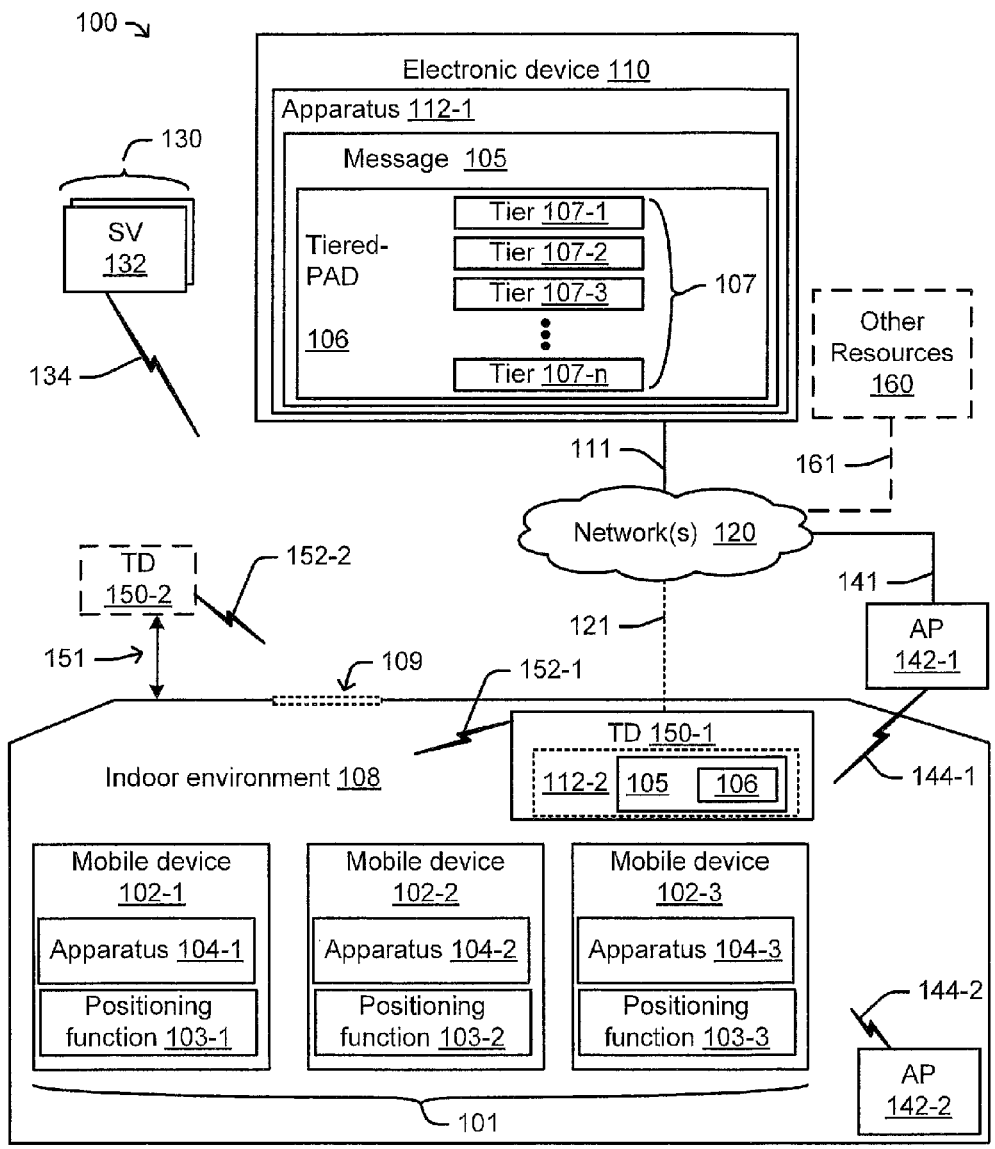
FIG. 1 is a schematic block diagram illustrating an arrangement of representative electronic devices comprising various example apparatuses, one or more of which may be used to support mobile device positioning within an indoor environment based, at least in part, on tiered positioning assistance data (tiered-PAD), in accordance with an example implementation.

In certain example implementations, a transmitting device may be provisioned within an indoor environment, or possibly within some threshold distance thereof, and arranged to broadcast a message that may be received by a variety of different mobile devices. As described in greater detail herein, such a message may comprise tiered positioning assistance data (tiered-PAD) which corresponds to the indoor environment. At least a portion of tiered-PAD may be selectively accessed and applied in some manner to affect a positioning function performed, at least in part, by the mobile device.

In accordance with certain aspects of the present description, tiered-PAD may comprise a plurality of different "tiers" of positioning assistance data, e.g., first tier positioning assistance data, second tier positioning assistance data, third tier positioning assistance data, fourth tier positioning assistance data, etc. In certain example implementations, at least two such tiers of positioning assistance data may comprise different positioning assistance data. Indeed, in certain example implementations, each tier of positioning assistance data may comprise different positioning assistance data. In some example implementations, two or more tiers of positioning assistance data may comprise, at least in part, the same or similar positioning assistance data but which may be differently formatted, e.g., for use by different positioning functions, mobile devices, etc.

Consequently, a message comprising tiered-PAD may be acquired and used, at least in part, by a variety of different mobile devices, some of which may benefit from accessing only certain portions, e.g., one or more tier(s) of the tiered-PAD. By way of example, a first mobile device may have a particular limitations such that only first tier PAD may be useful, a second mobile device may have different limitations such that first tier PAD and second tier PAD may be useful, and still further a third mobile device may have specific limitations such that first tier PAD, second tier PAD and third tier PAD may be useful. In another example, a particular mobile device may have limitations such that only fourth tier PAD may be useful.

As may be appreciated, a potential benefit to a message as described above, is that the number of messages that may need to be generated and transmitted to provide applicable positioning assistance data to a variety of different mobile devices may be substantially reduced, possibly to a single message (e.g., a "generic" message), through the use of tiered-PAD.

Furthermore, in certain example implementations, tiered-PAD may be generated for an indoor environment and predetermined messages generated for subsequent (e.g., repeated) broadcast by one or more transmitting devices. Accordingly, another potential benefit may be that such a transmitting device may operate in a standalone mode and/or operate without significant support from other possibly networked resources. Indeed, in certain instances, such a transmitting device(s) may be relatively less complex and/or cost-efficient when compared to certain other transmitting devices and/or attendant network resources (e.g., servers, etc.) which may otherwise be required to provide specific positioning assistance data (possibly dynamically created) and forward like-specific messages to individual mobile devices, and/or certain groups of mobile devices.

In certain example implementations, having received a message comprising tiered-PAD, a mobile device may determine which of the plurality of different tiers of positioning assistance data may be useful, e.g., to apply to, and/or otherwise affect in some manner, a positioning function performed, at least in part, by the mobile device.

Thus, in certain instances a mobile device may determine which of the plurality of different tiers of tiered-PAD to access based, at least in part, on the type of information provided in each tier of positioning assistance data. For example, in certain instances third tier PAD may comprise an electronic map and/or the like corresponding to an indoor environment. Hence, if such an electronic map and/or the like may be useful to a positioning function performed by a given mobile device, then a determination may be made to access at least such example third tier PAD. Conversely, if such an electronic map and/or the like would not be useful to a positioning function performed by another mobile device, then that mobile device simply ignore such third tier PAD.

In another example, in certain implementations a mobile device may determine which of the plurality of different tiers of positioning assistance data to access based, at least in part, a current state of the mobile device and/or the like which may be demonstrative of available processing capabilities, available data storage capabilities, certain operational modes (e.g., power saving modes, emergency positioning modes, user selected modes, etc.), and/or the like or some combination thereof. For example, let us assume that tiered-PAD in a particular message comprises first tier PAD indicative of potential WiFi access points (e.g., by corresponding MAC addresses and coordinate positions), which may transmit wireless signals that may be acquired a mobile device while located an indoor environment. Let us further assume that such tiered-PAD comprises second tier PAD indicative of one or more wireless signal propagation related parameters (e.g., a path loss parameter, etc.) corresponding to a signaling environment within at least a portion of the indoor environment. Let us assume further that such first tier PAD and such second tier PAD may be useful to a positioning function performed by the mobile device. In certain instances, however, a current state of such a mobile device may affect the positioning function in some manner such that either the first tier PAD or the second tier PAD may no longer be useful. By way of example, such a current state of the mobile device may seek to reduce electrical power consumption (e.g., to conserve battery power, etc.), and/or possibly to reduce certain data processing and/or storage requirements, just to name a few examples. Conversely, in another current state (, e.g., an emergency location mode, etc.) the same mobile device may act to make use of all available or otherwise applicable tiers of positioning assistance data.

In still another example, in certain implementations a mobile device may determine which of the plurality of different tier positioning assistance data to access based, at least in part, on a service access capability, which may correspond to the mobile device, a particular entity/user account, a particular service provider, and/or the like or some combination thereof. Thus, for example, a service access capability may act to limit or permit access to one or more particular different tiers of positioning assistance data in the tiered-PAD. By way of example, in certain instances a service access capability may indicate that a mobile device may access particular tiers of positioning assistance data corresponding to certain premium, paid, and/or otherwise possibly enhanced types of positioning assistance data in the tiered-PAD.

For this and/or certain other reasons, in some example implementations, one or more protection schemes (e.g., encoding, encryption, etc.) may be applied to control access to one or more particular tiers of tiered-PAD. Thus, for example, in certain instances a first tier protection scheme may be applied to control access to at least first tier PAD, and a second tier protection scheme may be applied to control access to at least a second tier PAD. In another example, a particular protection scheme may be applied to control access to two or more tiers of positioning assistance data in the tiered-PAD (e.g., fifth tier positioning assistance data and six tier positioning assistance data).

Although claimed subject matter is not necessarily so limited, in a particular example implementation tiered-PAD may comprise three tiers. Here, for example, first tier PAD may be useful to most if not all mobile devices and indicative of one or more wireless signal transmitting devices capable of transmitting wireless signals that may be acquired by a mobile device while located within an indoor environment, and a location of such wireless signal transmitting device(s). In this example, second tier PAD may be indicative of one or more wireless signal propagation related parameters corresponding to at least a portion of the indoor environment. Here, for example, one or more wireless signal propagation related parameter parameters may be indicative of a transmission power for certain wireless transmitting devices and/or signals, channel characteristics, etc.

Continuing with the above example, third tier PAD may be indicative of one or more navigation parameters corresponding to at least a portion of the indoor environment, and/or possibly an identifier (e.g., a universal resource locator (URL), etc.) for one or more network resources (e.g., positioning servers, location based service devices, etc.) that may be capable of providing all or part of one or more such navigation parameters. Thus, for example, one or more navigation parameters may be indicative of certain features in an electronic map and/or the like corresponding to an indoor environment. Thus, for example, one or more navigation parameters may be indicative of one or more physical objects within an indoor environment which may affect navigation thereof by a user and/or machine transporting a mobile device. In certain instances, one or more navigation parameters may be provided which may allow certain mobile devices to generate an electronic map and/or the like corresponding to an indoor environment. In another example, one or more navigation parameters may be indicative of one or more applicable paths, e.g., as may be indicated in a routability graph and/or the like. In certain instances, one or more navigation parameters may be provided which may allow certain mobile devices to generate a routability graph and/or the like corresponding to an indoor environment. In another example, one or more navigation parameters may be indicative of a radio heatmap and/or the like corresponding to an electronic map of an indoor environment. In certain instances, one or more navigation parameters may be provided which may allow certain mobile devices to generate a radio heatmap and/or the like corresponding to an indoor environment.

In certain example implementations, in response to receiving a message comprising tiered-PAD, a mobile device may initiate a wireless signal reception calibration process, e.g., corresponding to a positioning function. In certain instances, such a wireless signal reception calibration process may be based, at least in part, on the message itself, and/or one or more subsequent messages and/or other like signals broadcast by one or more transmitting devices. For example, a wireless signal reception calibration process may be based, at least in part, on a received signal strength indicator (RSSI) and/or the like for one or more wireless signals acquired by a mobile device.

In accordance with certain other aspects, a method may be provided for use at one or more computing platforms to generate tiered-PAD corresponding to an indoor environment. Here, for example, one or more computing platforms may generate tiered-PAD indicative of at least first tier PAD to affect at least a positioning function of a first mobile device while located in the indoor environment, and a positioning function of a second mobile device while located in the indoor environment. Additionally, for example, such tiered-PAD may be indicative of at least second tier PAD to affect at least the second positioning function in the second mobile device while located in such indoor environment, but not the first positioning function in the first mobile device.

Such one or more computing platforms may further generate at least a portion of a message comprising tiered-PAD for transmission to at least such a first mobile device and such a second mobile device by a transmitting device provisioned within the indoor environment or within a threshold distance from the indoor environment. Hence, in certain instances, such one or more computing platforms may be provisioned separately from such a transmitting device, and may provide at least a portion of the message to the transmitting device (e.g., via one or more wired and/or wireless communication links, a network, or possibly a non-tangible computer readable medium). However, in other instances, such one or more computing platforms may be provisioned as part of such a transmitting device.

With this introduction in mind, attention is now drawn to FIG. 1, which is a schematic block diagram illustrating an example arrangement 100 comprising a plurality of mobile devices 101 represented, in this example, by mobile devices 102-1, 102-2, and 102-3 having apparatuses 104-1, 104-2, and 104-3, respectively. Apparatuses 104-1, 104-2, and 104-3 may obtain a message 105 comprising tiered-PAD 106. In certain instances, having received the same message (i.e., message 105) two or more of apparatuses 104-1, 104-2, and 104-3 may (independently) access the same portion (e.g., one or more particular tiers of positioning assistance data) in tiered-PAD 106 in their respective messages 105. In certain instances, two or more of apparatuses 104-1, 104-2, and 104-3 may access different portions (e.g., one or more different tiers, one or more different sets of tiers) of tiered-PAD 106 in their respective messages 105. Accordingly, in certain instances message 105 may act a type of "generic" message comprising various tiers of positioning assistance data that may be selectively accessed and applied by different mobile devices, e.g., depending upon their capabilities, needs, users, etc.

In certain example implementations, tiered-PAD 106 may be generated by one or more electronic devices represented in FIG. 1 by electronic device 110. By way of example, electronic device 110 may comprise a computing platform (e.g., a server, etc.) comprising an apparatus 112-1 to generate tiered-PAD 106, and in certain instances all or part of message 105. As illustrated, tiered-PAD 106 may comprise a plurality of tiers 107, represented here by first tier PAD 107-1, second tier PAD 107-2, third tier PAD 107-3, . . . , $n^{th}$ tier PAD 107-$n$.

In certain instances, apparatus 112-1 may generate all or part of tiered-PAD 106 by obtaining applicable positioning assistance data for one or more of the plurality of tiers 107 from one or more other resources. Thus, for example, in certain instances apparatus 112-1 may obtain all or part of a particular tier of positioning assistance data from one or more other resources 160 (e.g., one or more other electronic devices) which may be arranged to provide such positioning assistance data to one or more mobile devices, e.g., in response to a request for such positioning assistance data from the mobile device.

In certain example implementations, apparatus 112-1 may generate all or part of tiered-PAD 106 by obtaining positioning assistance data for one or more of the plurality of tiers 107 from one or more data files and/or user inputs. Hence, for example, in certain instances some of tiered-PAD 106 may be input by and/or otherwise identified by an administrator, copied from a computer readable medium, downloaded from another electronic device, scanned from a hardcopy document, etc.

In certain example implementations, in addition or alternatively to acting as an aggregator of positioning assistance data, in certain instances apparatus 112-1 may generate (e.g., using known techniques) all or part of tiered-PAD 106.

As illustrated in example arrangement 100, electronic device 110 may be connected via a communication link 111 to a network(s) 120. Accordingly, apparatus 112-1 in electronic device 110 may access other resources 160, e.g. via network(s) 120 and communication link 161. Additionally, apparatus 112-1 electronic device 110 may provide all or part of message 105 and/or tiered-PAD 106 to one or more transmitting devices that may be provisioned within or nearby an indoor environment 108 to transmit a message 105 to one or more mobile devices. In example arrangement 100, such transmitting devices are represented by a transmitting device (TD) 150-1 that is illustrated as being arranged within indoor environment 108, and a TD 150-2 that is illustrated as being arranged within a threshold distance 151 of indoor environment 108. TD 150-1 is shown as possibly being connected to network(s) 120 via communication link 121. In certain instances, although not shown, TD 150-1 may be connected directly to one or more other electronic devices. Although not illustrated, TD 150-2 may also be connected to network(s) 120, and/or to one or more other electronic devices either directly or indirectly. In certain example implementations, TD 150-1 and/or TD 150-2 may represent standalone devices.

Although illustrated using solid lines and/or dashed lines, it should be understood that communication links 111, 121, 141, and 161 may represent one or more wired/fiber and/or wireless communication links, and possibly additional devices and/or services.

Although illustrated separately and arranged in different positions relative to indoor environment 108, in certain instances, TD 150-1 and TD 150-2 may have the same or similar capabilities, and/or comprise the components/form. In certain example implementations, as illustrated by TD 150-1, a transmitting device may obtain tiered-PAD 106, e.g., from apparatus 112-1 in electronic device 110. In certain instances, such a transmitting device may also obtain at least part of message 105, e.g. from apparatus 112-1 in electronic device 110. In still other instances, such a transmitting device may generate all or part of message 105 based, at least in part, on tiered-PAD 16 obtained from apparatus 112-1 in electronic device 110.

In certain other example implementations, TD 150-1 may comprise an apparatus 112-2, which in certain instances may be the same or similar to apparatus 112-1, and/or which may generate all or part of tiered-PAD 106, e.g., using similar techniques as described above regard to apparatus 112-1. Apparatus 112-2 may generate all or part of message 105, which may be subsequently transmitted by TD 150-1 as illustrated by wireless signal(s) 152-1. Although not illustrated, TD 150-2 may be similarly configured so as to eventually transmit a similarly generated message 105 as illustrated by wireless signal(s) 152-2.

Consequently, in certain instances, all or part of the techniques provided herein may be implemented in one or more apparatuses within one or more electronic devices to generate all or part of tiered-PAD 106 and/or all or part of a message 105, which may be transmitted to one or more mobile devices.

In certain implementations, one or more transmitting devices may be provisioned to transmit message 105 with regard to a particular indoor environment 108. In certain instances, all or possibly just specific regions of an indoor environment 108 may be within a coverage area of a single transmitting device. In some implementations, an indoor environment 108 may benefit from having a plurality of transmitting devices arranged to provide a desired level of coverage for indoor environment 108. For example, an indoor environment having multiple levels may benefit from having a plurality of transmitting devices arranged to provide adequate coverage within certain applicable levels.

In certain instances, one or more transmitting devices may be provisioned at or nearby an opening 109 (e.g., an entryway, a staircase, an elevator, etc.) through which a mobile device may enter/leave indoor environment 108. Still further, in certain instances one or more transmitting devices may be provisioned at specific locations to support a wireless signal reception calibration process corresponding to a positioning function in a mobile device.

In some implementations it may be beneficial to have one or more transmitting devices provided for specific regions within an indoor environment and/or entities/services within therein. For example, a large tenant store within a shopping mall may benefit by provisioning its own transmitting device (e.g., to provide specific/enhanced positioning assistance data in the form of tiered-PAD corresponding to store) at or near an entrance to the shopping mall and/or the store, possibly alongside or nearby one or more other transmitting devices (e.g., provisioned to provide certain positioning assistance data and/or tiered-PAD for the shopping mall).

Arrangement 100 further illustrates that other transmitting devices (e.g., positioning Beacon transmitting devices, wireless network access points, femtocell/picocell or other like communication network augmentation devices, etc.) may be provisioned to communicate with mobile devices located within indoor environment 108 using wireless signals, some of which may be used for positioning. Thus, by way of representation, access points (APs) 142-1 and 142-2 are illustrated as communicating over wireless communication links 144-1 and 144-2, respectively. In this example, AP 142-1 is illustrated as being arranged outside of indoor environment 108 and AP 142-2 is illustrated as being arranged within indoor environment 108. One or more of the access points may be connected to network(s) 120, e.g., as represented by AP 142-1 and communication link 141.

Although several examples have been presented herein, it should be recognized that a wide variety of wireless signal transmitting/transceiver devices and/or arrangements thereof may be provisioned with regard to an indoor environment, and that many such systems are well known and also beyond the scope of the present disclosure. Likewise, a wide variety of corresponding wireless signal-based positioning techniques, and/or the like or some combination thereof, are also well known and also beyond the scope of the present disclosure.

Network(s) 120 is intended to represent all or part of one or more other electronic devices and/or communication facilities/resources capable of supporting wired and/or wireless electronic communication. Thus for example, network(s) 120 may comprise all or part of a telephone network, a cellular telephone network, a wireless communication network, an intranet, the Internet, and/or the like or some combination thereof.

As further illustrated, in certain implementations arrangement 100 may comprise one or more space positioning systems (SPS) 130, which may transmit applicable wireless signals that may, at times, be acquired by a mobile device and used, at least in part, to support a positioning function. Here, for example, SPS 130 may comprise a plurality of space vehicles (SVs) 132, each of which may transmit one or more SPS signals 134. It should be understood that in certain instances a mobile device within indoor environment 108 may, at times, be unable to adequately acquire SPS signals 134 to perform a position fix based solely thereon. As such, a positioning function within a mobile device may attempt to perform a position fix based, at least in part, on one or more wireless signals obtained from one or more terrestrial-based transmitting devices, e.g., such as, AP 142-1, AP 142-2, etc.

As illustrated, mobile device 102-1 comprises apparatus 104-1 to obtain message 105 from the transmitting device, e.g., such as TD 150-1. Apparatus 104-1 may access a specific portion of tiered-PAD 106, and affect positioning function 103-1 based, at least in part, on such specific portion. Positioning function 103-1 may, in certain instances, be performed independently by mobile device 102-1. In certain other instances, positioning function 103-1 may be performed with assistance by one or more other electronic devices.

Likewise, mobile device 102-2 comprises apparatus 104-2 to obtain message 105 from the transmitting device, e.g., such as TD 150-1. Apparatus 104-2 may access a specific portion of tiered-PAD 106, and affect positioning function 103-2 based, at least in part, on such specific portion. Positioning function 103-2 may, in certain instances, be performed independently by mobile device 102-2. In certain other instances, positioning function 103-2 may be performed with assistance by one or more other electronic devices.

Mobile device 102-3 comprises apparatus 104-3 to obtain message 105 from the transmitting device, e.g., such as TD 150-1. Apparatus 104-3 may access a specific portion of tiered-PAD 106, and affect positioning function 103-3 based, at least in part, on such specific portion. Positioning function 103-3 may, in certain instances, be performed independently by mobile device 102-3. In certain other instances, positioning function 103-3 may be performed with assistance by one or more other electronic devices.

Figure 2:
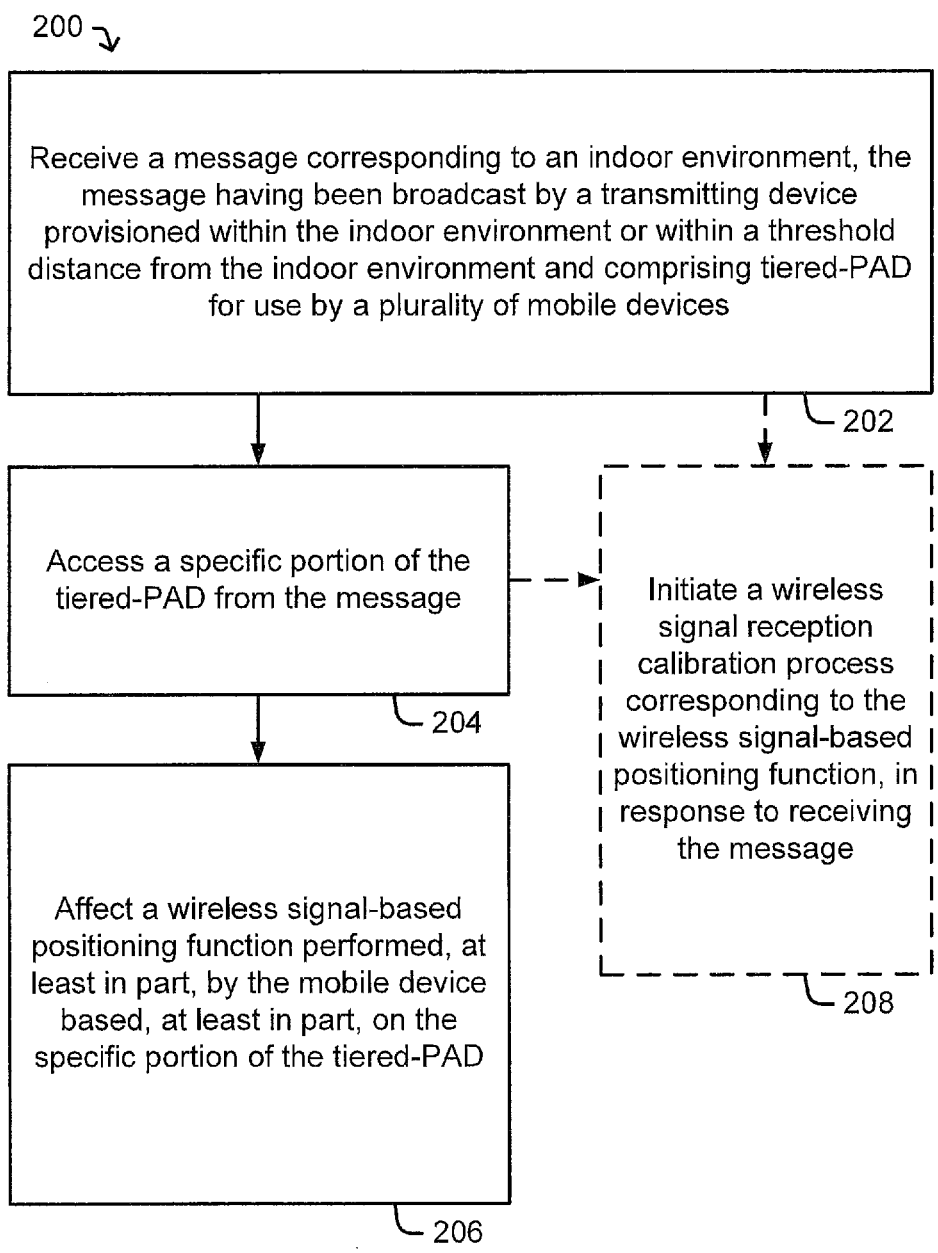
FIG. 2 is a flow diagram illustrating an example process that may be implemented within a mobile device to support mobile device positioning within an indoor environment based, at least in part, on tiered-PAD, in accordance with an example implementation.

Attention is drawn next to FIG. 2, which is a flow diagram illustrating an example process 200 that may be implemented, at least in part, in a mobile device, e.g., such as mobile device 102-1.

At example block 202, a message 105 corresponding to an indoor environment 108 may be received, e.g., over one or more wireless signals 152-1 broadcast by a TD 150-1 provisioned within the indoor environment or one or more wireless signals 152-2 broadcast by a TD 150-2 provisioned within a threshold distance 151 from indoor environment 108. Message 105 may comprise tiered-PAD 106 for use by a plurality of mobile devices 101. Thus for example, message 105 may also be similarly received by mobile devices 102-2 and 102-3.

At example block 204, a specific portion of tiered-PAD 106 may be accessed from message 105. For example, apparatus 104-1 in mobile device 102-1 may select one or more tiers of positioning assistance data from a plurality of tiers 107, and particularly tier(s) that may be useful to mobile device 102-1. At example block 206, a positioning function 103-1 performed, at least in part, by the mobile device based, at least in part, on the specific portion of the tiered-PAD.

At example block 208 (which as represented by the dashed lined box may be optional), one or more wireless signal reception calibration processes may be initiated in response to receiving message 105. For example, in certain instances a wireless signal reception calibration process may be initiated in mobile device 102-1 which may correspond to (e.g., affect, make use of, etc.) positioning function 103-1.

Figure 3:
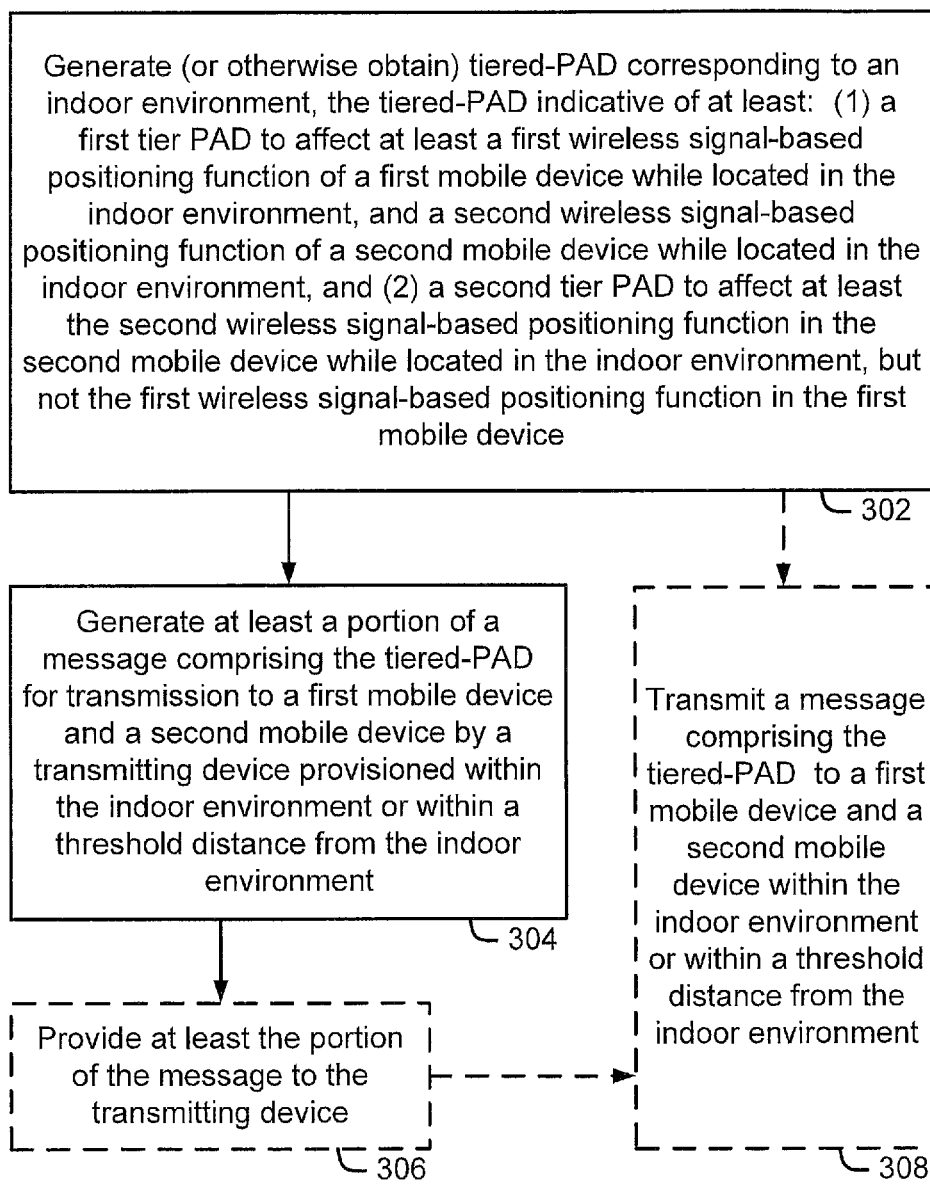
FIG. 3 is a flow diagram illustrating an example process that may be implemented within an electronic device to support mobile device positioning within an indoor environment based, at least in part, on tiered-PAD, in accordance with an example implementation.

Attention is drawn next to FIG. 3, which is a flow diagram illustrating an example process 300 that may be implemented, at least in part, in a computing platform, which may be provisioned in an electronic device 110, a transmitting device (e.g., TD 150-1), and/like or some combination thereof.

At example block 302, tiered-PAD 106 corresponding to an indoor environment 108 may be generated. In certain example implementations, tiered-PAD 106 may be indicative of at least: (1) first tier PAD 107-1 to affect at least a positioning function 103-1 of a first mobile device 102-1 while located in indoor environment 108, and a positioning function 103-2 of a second mobile device 102-2 while located in indoor environment 108; and, (2) second tier PAD 107-2 to affect at least second positioning function 103-2 in second mobile device 102-2 while located in indoor environment 108, but not first positioning function 103-1 in first mobile device 102-1. Thus, for example, in certain instances mobile device 102-1 may only be capable of making use of first tier PAD 107-1, while mobile device 102-2 may be further capable of making use of both first tier PAD 107-1 and second tier PAD 107-2. As previously mentioned, in certain instances, an apparatus 104-1 may be provided in first mobile device 102-1 to select a specific portion of tiered-PAD 106 applicable for use by positioning function 103-1. Similarly, in certain instances, an apparatus 104-2 may be provided in second mobile device 102-2 to select a specific portion of tiered-PAD 106 applicable for use by positioning function 103-2.

At example block 304, at least a portion of a message 105 may be generated, which comprises tiered-PAD 106 for transmission to one or more mobile devices by a transmitting device, e.g., TD 150-1 provisioned within indoor environment 108, and/or TD 150-2 provisioned within a threshold distance 151 from indoor environment 108. As previously mentioned, the same message 105 may be received by a plurality of mobile devices 101, each of which may select a specific portion of tiered-PAD 106, e.g., based on its particular needs, constraints, etc.

At example block 306 (which may be optional in certain implementations), at least the portion of message 105 may be provided to a transmitting device, e.g., such as, TD 150-1 and/or TD 150-2. Here, for example, in certain instances all or part of message 105 may be transmitted from electronic device 110 over one or more communication links and/or network(s) 120 the applicable transmitting device(s). In certain other instances, all or part of message 105 may be provided to one or more applicable transmitting devices via a computer readable medium.

Example block 306 may be unnecessary in certain instances. For example, example block 306 may be unnecessary should TD 150-1 comprise an apparatus 112-2 to implement all or part of example blocks 302 and/or 304. Accordingly, example block 306 may be unnecessary because such an applicable transmitting device when it already possess the message 105 and/or the tiered-PAD 106, it so generated.

However, in certain instances, example block 306 may be useful to TD 150-1 comprising apparatus 112-2 if TD 150-1 were to further transmit all or part of message 105 and/or tiered-PAD 106 to one or more other (applicable) transmission devices. Thus for example, in certain instances TD 150-1 may transmit all or part of message 105 and/or tiered-PAD 106 to TD 150-2, e.g., via a direct or indirect, wired and/or wireless communication link, etc. (not shown).

As further illustrated in process 300, in certain example implementations tiered-PAD 106 may be obtained at example block 302, and at example block 308 a message comprising tiered-PAD 106 may be transmitted to a first mobile device and a second mobile device, e.g. which may be within the indoor environment or within a threshold distance from the indoor environment. Consequently, as illustrated example blocks 302 and 308 may be implemented in a transmitting device, which may in certain instances be provisioned as a stand-alone device. Hence, for example, tiered-PAD 106 may be obtained at example block 302 by such a transmitting device from a computer readable medium instead of or possibly in addition to or alternative to receiving tiered-pad 106 and/or message 105 via a direct or indirect communication link.

Figure 4:
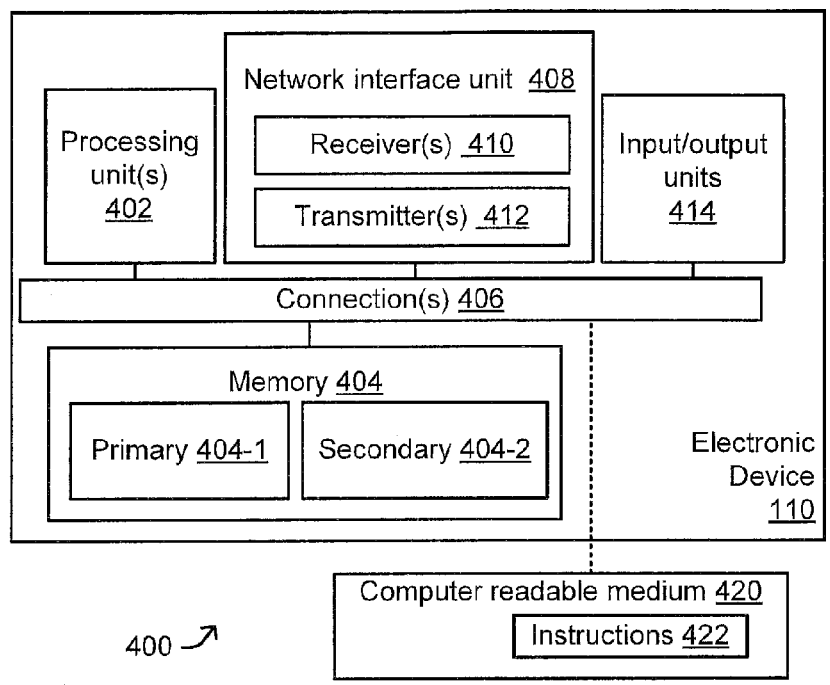
FIG. 4 is a schematic diagram illustrating certain features of an example electronic device to support mobile device positioning within an indoor environment based, at least in part, on tiered-PAD, in accordance with an example implementation.

Attention is now drawn to FIG. 4, which is a schematic block diagram illustrating certain features of an example special computing platform 400 which may be provided as part of electronic device 110, and/or apparatus 112 provisioned therein. In certain implementations, electronic device 110 may take the form of a wireless transceiver device, e.g., such as, an access point and/or the like.

As illustrated special computing platform 400 may comprise one or more processing units 402 (e.g., to perform data processing in accordance with the techniques provided herein, e.g., of apparatus 112-1) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located/coupled with processing unit(s) 402, or other like circuitry within electronic device 110. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Special computing platform 400 may, for example, further comprise one or more network interface unit(s) 408. Network interface unit(s) 408 may, for example, comprise one or more wired and/or network interface units, represented here by one or more receivers 410 and one or more transmitters 412. It should be understood that in certain implementations, network interface unit 408 may comprise one or more transceivers, and/or the like. Further, it should be understood that although not shown, network interface unit 408 may comprise one or more antennas and/or other circuitry as may be applicable given the network interface unit function/capability.

In accordance with certain example implementations, network interface unit(s) 408 may, for example, be enabled for use with various wired communication networks, e.g., such as telephone system, a local area network, a wide area network, a personal area network, an intranet, the Internet, etc.

Accordance with certain example implementations network interface unit(s) 408 and/or 508 (see FIG. 5) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, network interface unit(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Electronic device 110 may, for example, further comprise one or more input/output units 414. Input/output units 414 may represent one or more devices or other like mechanisms that may be used to obtain inputs from and/or provide outputs to one or more other devices and/or a user. Thus, for example, input/output units 414 may comprise various buttons, switches, a touch pad, a trackball, a joystick, a touch screen, a keyboard, and/or the like, which may be used to receive one or more user inputs. In certain instances, input/output units 414 may comprise various devices that may be used in producing a visual output, an audible output, and/or a tactile output for a user. For example, input/output units 414 may be used to present a video display, graphical user interface, etc., on a display mechanism.

Figure 5:
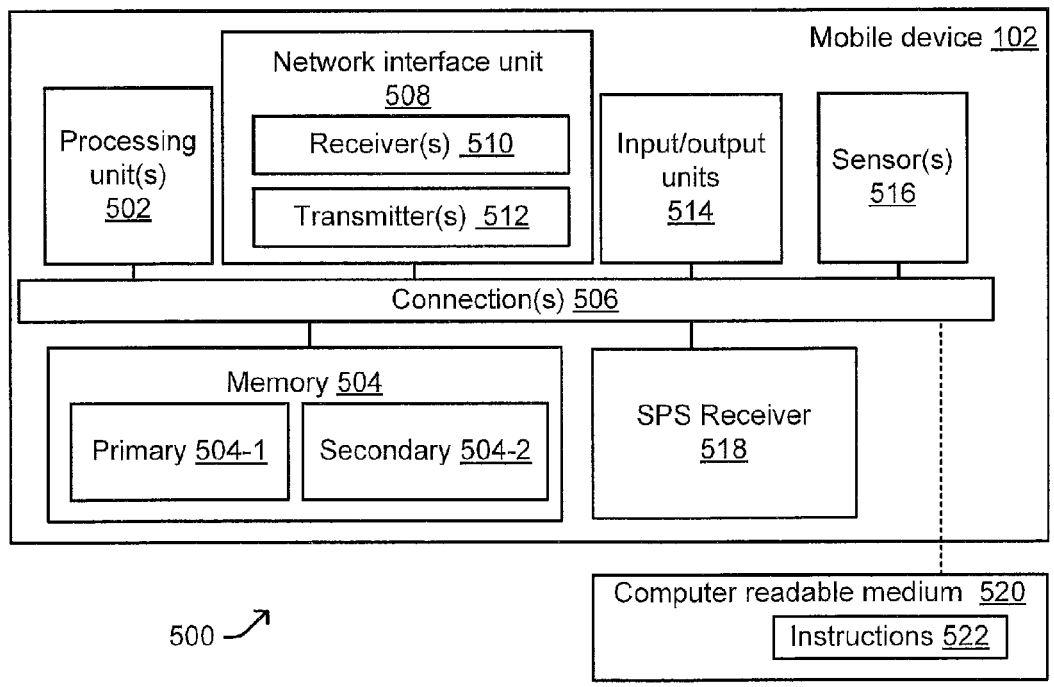
FIG. 5 is a schematic diagram illustrating certain features of an example mobile device to support mobile device positioning within an indoor environment based, at least in part, on tiered-PAD, in accordance with an example implementation.

Attention is now drawn to FIG. 5, which is a schematic block diagram illustrating certain features of an example special computing platform 500 which may be provided as part of representative mobile device 102-1, and/or representative apparatus 104-1 provisioned therein. Special computing platform 500 may similarly be provided as part of one or more other mobile devices as presented herein.

As illustrated special computing platform 500 may comprise one or more processing units 502 (e.g., to perform data processing in accordance with the techniques provided herein, apparatus 104-1) coupled to memory 504 via one or more connections 506 (e.g., one or more electrical conductors, one or more electrically conductive paths, one or more buses, one or more fiber-optic paths, one or more circuits, one or more buffers, one or more transmitters, one or more receivers, etc.). Processing unit(s) 502 may, for example, be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 504 may be representative of any data storage mechanism. Memory 504 may include, for example, a primary memory 504-1 and/or a secondary memory 504-2. Primary memory 504-1 may comprise, for example, a random access memory, read only memory, etc. While illustrated in this example as being separate from the processing units, it should be understood that all or part of a primary memory may be provided within or otherwise co-located/coupled with processing unit(s) 502, or other like circuitry within mobile device 102-1. Secondary memory 504-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 520. Memory 504 and/or non-transitory computer readable medium 520 may comprise instructions 522 for use in performing data processing, e.g., in accordance with the applicable techniques as provided herein.

Special computing platform 500 may, for example, further comprise one or more network interface units 508. Network interface unit 508 may, for example, comprise one or more wired and/or network interface units, represented here by one or more receivers 510 and one or more transmitters 512. It should be understood that in certain implementations, network interface unit 508 may comprise one or more transceivers, and/or the like. Further, it should be understood that although not shown, network interface unit 508 may comprise one or more antennas and/or other circuitry as may be applicable given the network interface unit function/capability.

In accordance with certain example implementations, network interface unit 508 may, for example, be enabled for use with various wired communication networks, e.g., such as telephone system, a local area network, a wide area network, a personal area network, an intranet, the Internet, etc.

Mobile device 102-1 may, for example, further comprise one or more input/output units 514. Input/output units 514 may represent one or more devices or other like mechanisms that may be used to obtain inputs from and/or provide outputs to one or more other devices and/or a user. Thus, for example, input/output units 514 may comprise various buttons, switches, a touch pad, a trackball, a joystick, a touch screen, a keyboard, a microphone, a camera, and/or the like, which may be used to receive one or more user inputs. In certain instances, input/output units 514 may comprise various devices that may be used in producing a visual output, an audible output, and/or a tactile output for a user. For example, input/output units 514 may be used to present a video display, graphical user interface, positioning and/or navigation related information, visual representations of electronic map, routing directions, etc., via a display mechanism and/or audio mechanism.

Mobile device 102-1 may, for example, comprise one or more sensors 516. For example, sensor(s) 516 may represent one or more environmental sensors, which may be useful in measuring certain atmospheric or other like phenomena which may occur in a particular environment. For example, sensor(s) 516 may represent one or more inertial sensors, which may be useful in detecting certain aspects of a particular environment and/or movements of mobile device 102-1 therein. Thus for example, sensor(s) 516 may comprise one or more accelerometers, one or one or more gyroscopes or gyrometers, one or more magnetometers and/or the like, one or more barometers, one or more thermometers, one or more particle detectors, etc. Further, in certain instances sensor(s) 516 may comprise and/or take the form of one or more input devices such as a microphone, a camera, a light sensor, etc.

SPS receiver 518 may be capable of acquiring and acquiring SPS signals 134 via one or more antennas (not shown). SPS receiver 518 may also process, in whole or in part, acquired SPS signals 134 for estimating a location and/or a motion of mobile device 102-1, e.g., when possible, such as when the mobile device is located outside of indoor environment 108. In certain instances, SPS receiver 518 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 102-1. In certain implementations, all or part of such processing of acquired SPS signals may be performed by other processing capabilities in mobile device 102-1, e.g., processing unit(s) 502, memory 504, etc., in conjunction with SPS receiver 518. Storage of SPS or other signals for use in performing positioning operations may be performed in memory 504 or registers (not shown).

In certain instances, sensor(s) 516 may generate analog or digital signals that may be stored in memory 504 and processed by DPS(s) (not shown) or processing unit(s) 502 in support of one or more applications such as, for example, applications directed to positioning or navigation operations based, at least in part, on one or more positioning functions.

Processing unit(s) 502 may comprise a dedicated modem processor or the like that may be capable of performing baseband processing of signals acquired and downconverted at receiver(s) 510 of network interface unit 508 or SPS receiver 509. Similarly, a modem processor or the like may perform baseband processing of signals to be upconverted for transmission by (wireless) transmitter(s) 512. In alternative implementations, instead of having a dedicated modem processor, baseband processing may be performed by a general purpose processor or DSP (e.g., general purpose/application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

Figure 6:
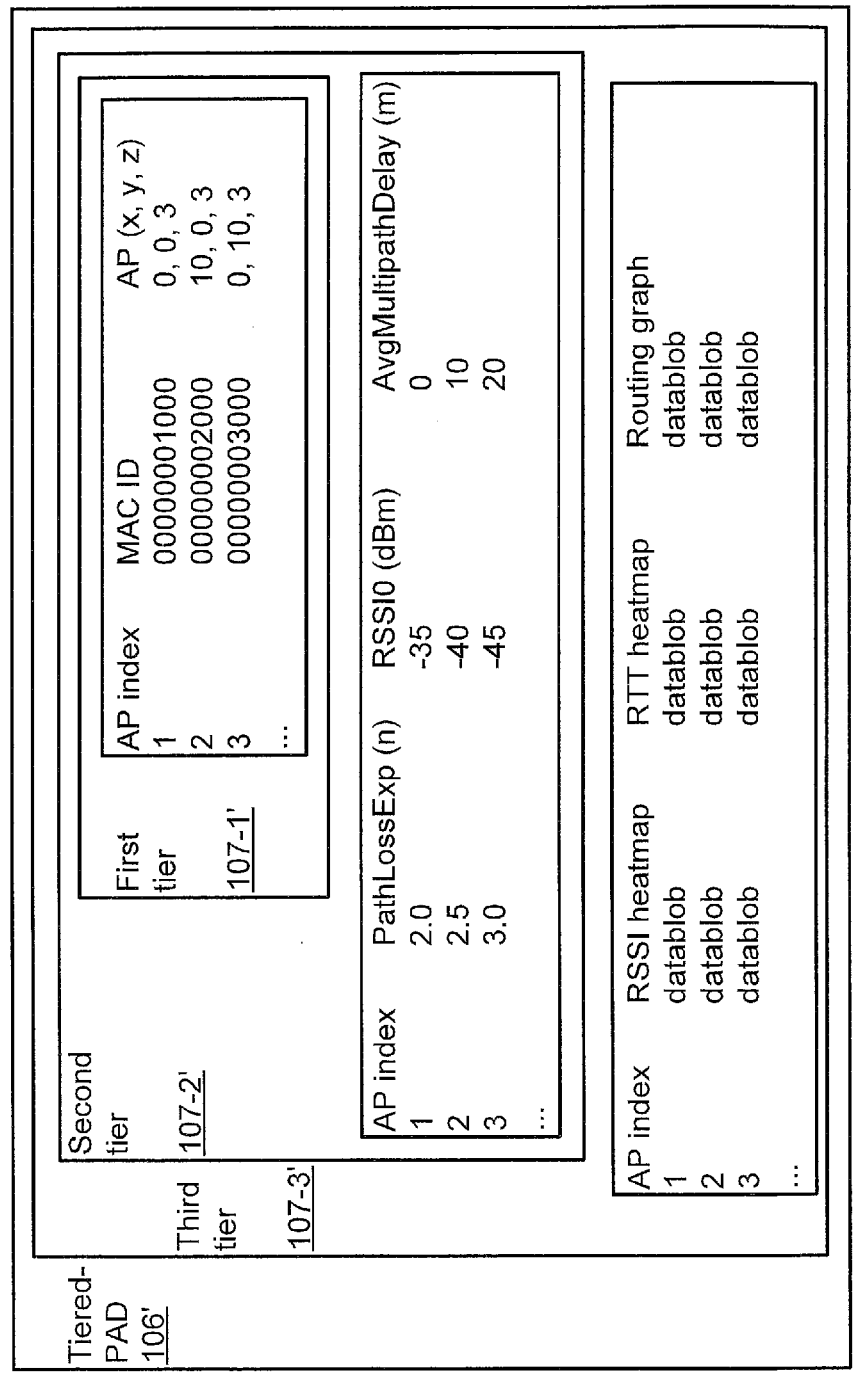
FIG. 6 is a schematic block diagram illustrating an example tiered-PAD, in accordance with an example implementation.

Attention is drawn next to FIG. 6 wherein some example positioning assistance data 600 is illustrated as being provided with an example tiered-PAD 106', in accordance with an implementation. As illustrated, positioning assistance data 600 may be divided into three tiers within tiered-PAD 106', namely, a first tier 107-1', a second tier 107-2', and a third tier 107-3'. While the three example tiers within tiered-PAD 106' are illustrated having a "nested" format, it should be understood that such tiers of PAD may be arranged in a variety of different formats. Accordingly, claimed subject matter is not intended to be limited to any particular format, and/or necessarily in a particular type(s) of positioning assistance data.

With this in mind, in this example, first tier 107-1' may comprise positioning assistance data identifying individual APs, e.g., by their MAC ID and location (e.g., x, y, z). In this example, individual APs also been assigned an AP index number. Here, for example, a first AP assigned AP index number "1" has MAC ID 00000001000 and location of x=0, y=0, and z=3; a second AP assigned AP index number "2" has MAC ID 00000002000 and location of x=10, y=0, and z=3; and, a third AP assigned AP index number "3" has MAC ID 00000003000 and location of x=0, y=10, and z=3.

As illustrated, second tier 107-2' may comprise further positioning assistance data for individual indexed APs. By way of example, such positioning assistance data may specify a PathLossExp(n), an RSSI0 (dBm), and an Avg-MultipathDelay (m), just to name a few examples. Here, for example, second tier 107-2' specifies: a PathLossExp(n)=2.0, an RSSI0 (dBm)=−35, and an AvgMultipathDelay (m)=0 for the first indexed AP; a PathLossExp(n)=2.5, an RSSI0 (dBm)=−40, and an AvgMultipathDelay (m)=10 for the second indexed AP; and a PathLossExp(n)=3.0, an RSSI0 (dBm)=−45, and an AvgMultipathDelay (m)=20 for the indexed third AP.

As further illustrated, third tier 107-3' may comprise still further positioning assistance data for individual indexed APs. By way of example, such positioning assistance data specify, for one or more indexed APs, applicable data, functions, etc. (represented here by the term "datablob"), which may correspond to an RSSI heatmap, and RTT heatmap, and a routing graph.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
   receiving, via a processing unit, a single generic message corresponding to an indoor environment, said message having been broadcast by a transmitting device provisioned within said indoor environment or within a threshold distance from said indoor environment and comprising tiered positioning assistance data (tiered-PAD) for use by a plurality of mobile devices;
   accessing, via said processing unit, a specific portion of said tiered-PAD from said message; and
   affecting a positioning function performed, at least in part, by said mobile device based, at least in part, on said specific portion of said tiered-PAD.

2. The method as recited in claim 1, wherein said tiered-PAD comprises at least a first tier positioning assistance data and a second tier positioning assistance data, and wherein said specific portion comprises at least said first tier positioning assistance data.

3. The method as recited in claim 2, and wherein said specific portion further comprises said second tier positioning assistance data.

4. The method as recited in claim 2, wherein, within said tiered-PAD, a first tier protection scheme is applied to control access to at least said first tier positioning assistance data, and a second tier protection scheme is applied to control access to at least said second tier positioning assistance data.

5. The method as recited in claim 2, wherein at least a portion of said first tier positioning assistance data is indicative of: (1) at least one wireless signal transmitting device capable of transmitting a wireless signal to said mobile device while located within said indoor environment; and (2) a location of said at least one wireless signal transmitting device.

6. The method as recited in claim 2, wherein at least a portion of said second tier positioning assistance data is indicative of a wireless signal propagation related parameter corresponding to at least a portion of said indoor environment.

7. The method as recited in claim 2, wherein said tiered-PAD further comprises at least third tier positioning assistance data, and wherein at least a portion of said third tier positioning assistance data is indicative of:
   a navigation parameter corresponding to at least a portion of said indoor environment; or
   an identifier for one or more network resources capable of providing at least said navigation parameter, or some combination thereof.

8. The method as recited in claim 1, wherein said tiered-PAD comprises a plurality of different tier positioning assistance data, and wherein said specific portion is based, at least in part, on a determination as to which of said plurality of different tier positioning assistance data apply to said positioning function.

9. The method as recited in claim 1, and further comprising, at said mobile device:
   in response to receiving said message, initiating a wireless signal reception calibration process corresponding to said positioning function.

10. The method as recited in claim 9, wherein said wireless signal reception calibration process is based, at least in part, on said message and/or one or more subsequent signals broadcast by said transmitting device.

11. An apparatus for use in a mobile device, the apparatus comprising:
   means for receiving a single generic message corresponding to an indoor environment, said message having been broadcast by a transmitting device provisioned within said indoor environment or within a threshold distance from said indoor environment and comprising tiered positioning assistance data (tiered-PAD) for use by a plurality of mobile devices;
   means for accessing a specific portion of said tiered-PAD from said message; and
   means for affecting a positioning function performed, at least in part, by said mobile device based, at least in part, on said specific portion of said tiered-PAD.

12. The apparatus as recited in claim 11, wherein said tiered-PAD comprises at least first tier positioning assistance data and second tier positioning assistance data, and wherein said specific portion comprises at least said first tier positioning assistance data.

13. The apparatus as recited in claim 12, and wherein said specific portion further comprises said second tier positioning assistance data.

14. The apparatus as recited in claim 12, wherein, within said tiered-PAD, a first tier protection scheme is applied to control access to at least said first tier positioning assistance data, and a second tier protection scheme is applied to control access to at least said second tier positioning assistance data.

15. The apparatus as recited in claim 12, wherein at least a portion of said first tier positioning assistance data is indicative of: (1) at least one wireless signal transmitting device capable of transmitting a wireless signal to said mobile device while located within said indoor environment; and (2) a location of said at least one wireless signal transmitting device.

16. The apparatus as recited in claim 12, wherein at least a portion of said second tier positioning assistance data is indicative of a wireless signal propagation related parameter corresponding to at least a portion of said indoor environment.

17. The apparatus as recited in claim 12, wherein said tiered-PAD further comprises at least third tier positioning assistance data, and wherein at least a portion of said third tier positioning assistance data is indicative of:
   a navigation parameter corresponding to at least a portion of said indoor environment; or
   an identifier for one or more network resources capable of providing at least said navigation parameter, or some combination thereof.

18. The apparatus as recited in claim 11, wherein said tiered-PAD comprises a plurality of different tier positioning assistance data, and wherein said specific portion is based, at least in part, on a determination as to which of said plurality of different tier positioning assistance data apply to said positioning function.

19. The apparatus as recited in claim 11, and further comprising:
   means for initiating a wireless signal reception calibration process corresponding to said positioning function, in response to receiving said message.

20. The apparatus as recited in claim 19, wherein said wireless signal reception calibration process is based, at least in part, on said message and/or one or more subsequent signals broadcast by said transmitting device.

21. A mobile device comprising:
   a network interface unit; and
   a processing unit configured to:
      obtain a single generic message corresponding to an indoor environment and received via said network interface unit, said message having been broadcast by a transmitting device provisioned within said indoor environment or within a threshold distance from said indoor environment and comprising tiered positioning assistance data (tiered-PAD) for use by a plurality of mobile devices;
      access a specific portion of said tiered-PAD from said message; and
      affect a positioning function performed, at least in part, by said mobile device based, at least in part, on said specific portion of said tiered-PAD.

22. The mobile device as recited in claim 21, wherein said tiered-PAD comprises at least a first tier positioning assistance data and a second tier positioning assistance data, and wherein said specific portion comprises at least said first tier positioning assistance data.

23. The mobile device as recited in claim 22, and wherein said specific portion further comprises said second tier positioning assistance data.

24. The mobile device as recited in claim 22, wherein, within said tiered-PAD, a first tier protection scheme is applied to control access to at least said first tier positioning assistance data, and a second tier protection scheme is applied to control access to at least said second tier positioning assistance data.

25. The mobile device as recited in claim 22, wherein at least a portion of said first tier positioning assistance data is indicative of: (1) at least one wireless signal transmitting device capable of transmitting a wireless signal to said mobile device while located within said indoor environment; and (2) a location of said at least one wireless signal transmitting device.

26. The mobile device as recited in claim 22, wherein at least a portion of said second tier positioning assistance data is indicative of a wireless signal propagation related parameter corresponding to at least a portion of said indoor environment.

27. The mobile device as recited in claim 22, wherein said tiered-PAD further comprises at least third tier positioning assistance data, and wherein at least a portion of said third tier positioning assistance data is indicative of:
 a navigation parameter corresponding to at least a portion of said indoor environment; or
 an identifier for one or more network resources capable of providing at least said navigation parameter, or some combination thereof.

28. The mobile device as recited in claim 21, wherein said tiered-PAD comprises a plurality of different tier positioning assistance data, and wherein said specific portion is based, at least in part, on a determination as to which of said plurality of different tier positioning assistance data apply to said positioning function.

29. The mobile device as recited in claim 21, said processing unit to further:
 initiate a wireless signal reception calibration process corresponding to said positioning function, in response to receiving said message via said network interface unit.

30. The mobile device as recited in claim 29, wherein said wireless signal reception calibration process is based, at least in part, on said message and/or one or more subsequent signals broadcast by said transmitting device.

31. An article comprising:
 a non-transitory computer readable medium having stored therein computer implementable instructions executable by a processing unit of a mobile device to:
  obtain a single generic message corresponding to an indoor environment, said message having been broadcast by a transmitting device provisioned within said indoor environment or within a threshold distance from said indoor environment and comprising tiered positioning assistance data (tiered-PAD) for use by a plurality of mobile devices;
  access a specific portion of said tiered-PAD from said message; and
  affect a positioning function performed, at least in part, by said mobile device based, at least in part, on said specific portion of said tiered-PAD.

32. The article as recited in claim 31, wherein said tiered-PAD comprises at least first tier positioning assistance data and second tier positioning assistance data, and wherein said specific portion comprises at least said first tier positioning assistance data.

33. The article as recited in claim 32, and wherein said specific portion further comprises said second tier positioning assistance data.

34. The article as recited in claim 32, wherein, within said tiered-PAD, a first tier protection scheme is applied to control access to at least said first tier positioning assistance data, and a second tier protection scheme is applied to control access to at least said second tier positioning assistance data.

35. The article as recited in claim 32, wherein at least a portion of said first tier positioning assistance data is indicative of: (1) at least one wireless signal transmitting device capable of transmitting a wireless signal to said mobile device while located within said indoor environment; and (2) a location of said at least one wireless signal transmitting device.

36. The article as recited in claim 32, wherein at least a portion of said second tier positioning assistance data is indicative of a wireless signal propagation related parameter corresponding to at least a portion of said indoor environment.

37. The article as recited in claim 32, wherein said tiered-PAD further comprises at least third tier positioning assistance data, and wherein at least a portion of said third tier positioning assistance data is indicative of:
 a navigation parameter corresponding to at least a portion of said indoor environment; or
 an identifier for one or more network resources capable of providing at least said navigation parameter, or some combination thereof.

38. The article as recited in claim 31, wherein said tiered-PAD comprises a plurality of different tier positioning assistance data, and wherein said specific portion is based, at least in part, on a determination as to which of said plurality of different tier positioning assistance data apply to said positioning function.

39. The article as recited in claim 31, said computer implementable instructions being further executable by said processing unit to:
 initiate a wireless signal reception calibration process corresponding to said positioning function, in response to receiving said message.

40. The article as recited in claim 39, wherein said wireless signal reception calibration process is based, at least in part, on said message and/or one or more subsequent signals broadcast by said transmitting device.

41. A method comprising, at a computing platform:
 generating, via a processing unit of an electronic device, tiered positioning assistance data (tiered-PAD) comprising a single generic message and corresponding to an indoor environment, said tiered-PAD indicative of at least:
  (1) a first tier positioning assistance data to affect at least a first positioning function of a first mobile device while located in said indoor environment, and a second positioning function of a second mobile device while located in said indoor environment, and
  (2) a second tier positioning assistance data to affect at least said second positioning function in said second mobile device while located in said indoor environment, but not said first positioning function in said first mobile device; and
 generating, via said processing unit of said electronic device, at least a portion of said message comprising said tiered-PAD for transmission to a first mobile device and a second mobile device by a transmitting device provisioned within said indoor environment or within a threshold distance from said indoor environment.

42. The method as recited in claim 41, wherein, within said message, a first tier protection scheme is applied to control access to at least said first tier positioning assistance data, and a second tier protection scheme is applied to control access to at least said second tier positioning assistance data.

43. The method as recited in claim 41, wherein at least a portion of said first tier positioning assistance data is indicative of: (1) at least one wireless signal transmitting device capable of transmitting a wireless signal to one or more mobile devices located within said indoor environment; and (2) a location of said at least one wireless signal transmitting device.

44. The method as recited in claim 41, wherein at least a portion of said second tier positioning assistance data is indicative of a wireless signal propagation related parameter corresponding to at least a portion of said indoor environment.

45. The method as recited in claim 41, wherein said tiered-PAD is further indicative of third tier positioning assistance data to affect at least a third positioning function of a third mobile device while located in said indoor environment, and wherein at least a portion of said third tier positioning assistance data is indicative of at least one of:
   a navigation parameter corresponding to at least a portion of said indoor environment; and/or
   an identifier for one or more network resources capable of providing at least said navigation parameter.

46. The method as recited in claim 41, and further comprising, at said computing platform:
   providing said at least said portion of said message to said transmitting device.

47. The method as recited in claim 41, wherein said transmitting device comprises said computing platform.

48. An apparatus comprising:
   means for generating tiered positioning assistance data (tiered-PAD) comprising a single generic message and corresponding to an indoor environment, said tiered-PAD indicative of at least:
      (1) a first tier positioning assistance data to affect at least a first positioning function of a first mobile device while located in said indoor environment, and a second positioning function of a second mobile device while located in said indoor environment, and
      (2) a second tier positioning assistance data to affect at least said second positioning function in said second mobile device while located in said indoor environment, but not said first positioning function in said first mobile device; and
   means for generating at least a portion of said message comprising said tiered-PAD for transmission to a first mobile device and a second mobile device by a transmitting device provisioned within said indoor environment or within a threshold distance from said indoor environment.

49. The apparatus as recited in claim 48, wherein, within said message, a first tier protection scheme is applied to control access to at least said first tier positioning assistance data, and a second tier protection scheme is applied to control access to at least said second tier positioning assistance data.

50. The apparatus as recited in claim 48, wherein at least a portion of said first tier positioning assistance data is indicative of: (1) at least one wireless signal transmitting device capable of transmitting a wireless signal to one or more mobile devices located within said indoor environment; and (2) a location of said at least one wireless signal transmitting device.

51. The apparatus as recited in claim 48, wherein at least a portion of said second tier positioning assistance data is indicative of a wireless signal propagation related parameter corresponding to at least a portion of said indoor environment.

52. The apparatus as recited in claim 48, wherein said tiered-PAD is further indicative of third tier positioning assistance data to affect at least a third positioning function of a third mobile device while located in said indoor environment, and wherein at least a portion of said third tier positioning assistance data is indicative of at least one of:
   a navigation parameter corresponding to at least a portion of said indoor environment; and/or
   an identifier for one or more network resources capable of providing at least said navigation parameter.

53. The apparatus as recited in claim 48, and further comprising:
   means for providing said at least said portion of said message to said transmitting device.

54. The apparatus as recited in claim 48, wherein said apparatus is provisioned within said transmitting device.

55. An electronic device comprising:
   memory; and
   a processing unit to:
      generate tiered positioning assistance data (tiered-PAD) comprising a single generic message and corresponding to an indoor environment, said tiered-PAD indicative of at least:
         (1) a first tier positioning assistance data to affect at least a first positioning function of a first mobile device while located in said indoor environment, and a second positioning function of a second mobile device while located in said indoor environment, and
         (2) a second tier positioning assistance data to affect at least said second positioning function in said second mobile device while located in said indoor environment, but not said first positioning function in said first mobile device; and
      generate at least a portion of said message comprising said tiered-PAD for transmission to a first mobile device and a second mobile device by a transmitting device provisioned within said indoor environment or within a threshold distance from said indoor environment.

56. The electronic device as recited in claim 55, wherein, within said message, a first tier protection scheme is applied to control access to at least said first tier positioning assistance data, and a second tier protection scheme is applied to control access to at least said second tier positioning assistance data.

57. The electronic device as recited in claim 55, wherein at least a portion of said first tier positioning assistance data is indicative of: (1) at least one wireless signal transmitting device capable of transmitting a wireless signal to one or more mobile devices located within said indoor environment; and (2) a location of said at least one wireless signal transmitting device.

58. The electronic device as recited in claim 55, wherein at least a portion of said second tier positioning assistance data is indicative of a wireless signal propagation related parameter corresponding to at least a portion of said indoor environment.

59. The electronic device as recited in claim 55, wherein said tiered-PAD is further indicative of third tier positioning assistance data to affect at least a third positioning function of a third mobile device while located in said indoor environment, and wherein at least a portion of said third tier positioning assistance data is indicative of at least one of:
   a navigation parameter corresponding to at least a portion of said indoor environment; and/or an identifier for one or more network resources capable of providing at least said navigation parameter.

60. The electronic device as recited in claim 55, and further comprising:
a network interface unit; and
said processing unit to further means initiate transmission of said at least said portion of said message to said transmitting device, via said network interface unit.

61. The electronic device as recited in claim 55, wherein said electronic device is provisioned within said transmitting device.

62. An article comprising:
a non-transitory computer readable medium having stored therein computer implementable instructions executable by a processing unit of an electronic device to:
generate tiered positioning assistance data (tiered-PAD) comprising a single generic message and corresponding to an indoor environment, said tiered-PAD indicative of at least:
  (1) a first tier positioning assistance data to affect at least a first positioning function of a first mobile device while located in said indoor environment, and a second positioning function of a second mobile device while located in said indoor environment, and
  (2) a second tier positioning assistance data to affect at least said second positioning function in said second mobile device while located in said indoor environment, but not said first positioning function in said first mobile device; and
generate at least a portion of said message comprising said tiered-PAD for transmission to a first mobile device and a second mobile device by a transmitting device provisioned within said indoor environment or within a threshold distance from said indoor environment.

63. The article as recited in claim 62, wherein, within said message, a first tier protection scheme is applied to control access to at least said first tier positioning assistance data, and a second tier protection scheme is applied to control access to at least said second tier positioning assistance data.

64. The article as recited in claim 62, wherein at least a portion of said first tier positioning assistance data is indicative of: (1) at least one wireless signal transmitting device capable of transmitting a wireless signal to one or more mobile devices located within said indoor environment; and (2) a location of said at least one wireless signal transmitting device.

65. The article as recited in claim 62, wherein at least a portion of said second tier positioning assistance data is indicative of a wireless signal propagation related parameter corresponding to at least a portion of said indoor environment.

66. The article as recited in claim 62, wherein said tiered-PAD is further indicative of third tier positioning assistance data to affect at least a third positioning function of a third mobile device while located in said indoor environment, and wherein at least a portion of said third tier positioning assistance data is indicative of at least one of:
a navigation parameter corresponding to at least a portion of said indoor environment; and/or
an identifier for one or more network resources capable of providing at least said navigation parameter.

67. The article as recited in claim 62, said computer implementable instructions being further executable by said processing unit to:
initiate transmission of said at least said portion of said message to said transmitting device.

68. The article as recited in claim 62, wherein said apparatus is provisioned within said transmitting device.

69. A method comprising, at a transmitting device:
obtaining, via a processing unit of said transmitting device, tiered positioning assistance data (tiered-PAD) comprising a single generic message and corresponding to an indoor environment, said tiered-PAD indicative of at least:
  (1) a first tier positioning assistance data to affect at least a first positioning function of a first mobile device while located in said indoor environment, and a second positioning function of a second mobile device while located in said indoor environment, and
  (2) a second tier positioning assistance data to affect at least said second positioning function in said second mobile device while located in said indoor environment, but not said first positioning function in said first mobile device; and
transmitting said message comprising said tiered-PAD to a first mobile device and a second mobile device within said indoor environment or within a threshold distance from said indoor environment.

70. The method as recited in claim 69, wherein, within said message, a first tier protection scheme is applied to control access to at least said first tier positioning assistance data, and a second tier protection scheme is applied to control access to at least said second tier positioning assistance data.

71. The method as recited in claim 69, wherein at least a portion of said first tier positioning assistance data is indicative of: (1) at least one wireless signal transmitting device capable of transmitting a wireless signal to one or more mobile devices located within said indoor environment; and (2) a location of said at least one wireless signal transmitting device.

72. The method as recited in claim 69, wherein at least a portion of said second tier positioning assistance data is indicative of a wireless signal propagation related parameter corresponding to at least a portion of said indoor environment.

73. The method as recited in claim 69, wherein said tiered-PAD is further indicative of third tier positioning assistance data to affect at least a third positioning function of a third mobile device while located in said indoor environment, and wherein at least a portion of said third tier positioning assistance data is indicative of at least one of:
a navigation parameter corresponding to at least a portion of said indoor environment; and/or
an identifier for one or more network resources capable of providing at least said navigation parameter.

74. An apparatus comprising:
means for obtaining tiered positioning assistance data (tiered-PAD) comprising a single generic message and corresponding to an indoor environment, said tiered-PAD indicative of at least:
  (1) a first tier positioning assistance data to affect at least a first positioning function of a first mobile device while located in said indoor environment, and a second positioning function of a second mobile device while located in said indoor environment, and
  (2) a second tier positioning assistance data to affect at least said second positioning function in said second mobile device while located in said indoor environment, but not said first positioning function in said first mobile device; and means for transmitting said message comprising said tiered-PAD to a first mobile device and a second mobile device within said indoor environment or within a threshold distance from said indoor environment.

75. A device comprising:
   memory;
   a transmitter; and
   a processing unit to:
      obtain tiered positioning assistance data (tiered-PAD) comprising a single generic message from said memory, said tiered-PAD corresponding to an indoor environment, said tiered-PAD indicative of at least:
         (1) a first tier positioning assistance data to affect at least a first positioning function of a first mobile device while located in said indoor environment, and a second positioning function of a second mobile device while located in said indoor environment, and
         (2) a second tier positioning assistance data to affect at least said second positioning function in said second mobile device while located in said indoor environment, but not said first positioning function in said first mobile device; and
      initiate transmission of said message comprising said tiered-PAD via said transmitter to a first mobile device and a second mobile device within said indoor environment or within a threshold distance from said indoor environment.

76. An article comprising:
   a non-transitory computer readable medium having stored therein computer implementable instructions executable by a processing unit of a device to:
      obtain tiered positioning assistance data (tiered-PAD) comprising a single generic message and corresponding to an indoor environment, said tiered-PAD indicative of at least:
         (1) a first tier positioning assistance data to affect at least a first positioning function of a first mobile device while located in said indoor environment, and a second positioning function of a second mobile device while located in said indoor environment, and
         (2) a second tier positioning assistance data to affect at least said second positioning function in said second mobile device while located in said indoor environment, but not said first positioning function in said first mobile device; and
      initiate transmission of said message comprising said tiered-PAD to a first mobile device and a second mobile device within said indoor environment or within a threshold distance from said indoor environment.

* * * * *